United States Patent
Taylor et al.

(10) Patent No.: US 10,067,736 B2
(45) Date of Patent: Sep. 4, 2018

(54) PROXIMITY BASED NOISE AND CHAT

(71) Applicant: SONY INTERACTIVE ENTERTAINMENT INC., Tokyo (JP)

(72) Inventors: Michael Taylor, San Mateo, CA (US); Dennis Dale Castleman, Fremont, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/394,313

(22) Filed: Dec. 29, 2016

(65) Prior Publication Data

US 2018/0095714 A1    Apr. 5, 2018

Related U.S. Application Data

(60) Provisional application No. 62/402,721, filed on Sep. 30, 2016.

(51) Int. Cl.
*G06F 17/00* (2006.01)
*G06F 3/16* (2006.01)

(52) U.S. Cl.
CPC .................. *G06F 3/165* (2013.01)

(58) Field of Classification Search
CPC .. G06F 3/165; H04S 2400/11; H04S 2400/15; H04S 7/30; H04S 7/301; H04S 7/302; H04S 7/303; H04S 7/304
See application file for complete search history.

(56) References Cited

U.S. PATENT DOCUMENTS

| | | | |
|---|---|---|---|
| 9,442,485 B1 | 9/2016 | McDermott et al. | |
| 2006/0095262 A1 | 5/2006 | Danielli | |
| 2008/0144884 A1 | 6/2008 | Habibi | |
| 2008/0154447 A1 | 6/2008 | Spinelli | |
| 2008/0221745 A1* | 9/2008 | Diamandis | A63K 3/00 701/3 |
| 2009/0187389 A1 | 7/2009 | Dobbins et al. | |
| 2010/0083038 A1 | 4/2010 | Pierce et al. | |
| 2010/0096491 A1* | 4/2010 | Whitelaw | A63K 3/00 244/15 |
| 2010/0305724 A1 | 12/2010 | Fry et al. | |

(Continued)

FOREIGN PATENT DOCUMENTS

WO    WO 2018/063594    4/2018

OTHER PUBLICATIONS

U.S. Appl. No. 15/394,473, Dennis Castleman, UAV Battery Form Factor and Insertion/Ejection Methodologies, filed Dec. 29, 2016.

(Continued)

*Primary Examiner* — Andrew C Flanders
(74) *Attorney, Agent, or Firm* — Polsinelli LLP (57) ABSTRACT

Disclosed are systems, methods, and non-transitory computer-readable storage media for altering and combining real and simulated audio streams. For example, a system can determine a location of a first unmanned aerial vehicle (UAV). The system can then determine a location of an object and can receive an audio stream associated with the object. The system can then determine a distance between the location of the first UAV and the location of the object. The system can adjust the audio stream volume according to the distance. The system can then send the audio stream to a listener.

17 Claims, 4 Drawing Sheets

(56) References Cited

U.S. PATENT DOCUMENTS

| | | | |
|---|---|---|---|
| 2012/0212399 A1* | 8/2012 | Border | G02B 27/017 345/8 |
| 2013/0328927 A1 | 12/2013 | Mount et al. | |
| 2015/0063610 A1* | 3/2015 | Mossner | H04S 5/005 381/307 |
| 2015/0346722 A1* | 12/2015 | Herz | G05D 1/0038 701/2 |
| 2016/0078759 A1 | 3/2016 | Nerayoff et al. | |
| 2016/0205654 A1 | 7/2016 | Robinson | |
| 2017/0053169 A1 | 2/2017 | Cuban et al. | |
| 2017/0061813 A1 | 3/2017 | Tao et al. | |
| 2017/0116723 A1 | 4/2017 | Aughey | |
| 2017/0158353 A1 | 6/2017 | Schmick | |
| 2017/0251323 A1* | 8/2017 | Jo | H04S 5/005 |
| 2017/0295446 A1* | 10/2017 | Thagadur Shivappa | H04S 7/304 |
| 2018/0093171 A1 | 4/2018 | Mallinson | |
| 2018/0093768 A1 | 4/2018 | Castleman | |
| 2018/0093781 A1 | 4/2018 | Mallinson | |
| 2018/0094931 A1 | 4/2018 | Taylor | |
| 2018/0095433 A1 | 4/2018 | Rico | |
| 2018/0095461 A1 | 4/2018 | Taylor | |
| 2018/0095463 A1 | 4/2018 | Castleman | |
| 2018/0096455 A1 | 4/2018 | Taylor | |
| 2018/0096611 A1 | 4/2018 | Kikuchi | |
| 2018/0098052 A1 | 4/2018 | Black | |

OTHER PUBLICATIONS

U.S. Appl. No. 15/394,511, Michael Taylor, Course Profiling and Sharing, filed Dec. 29, 2016.

U.S. Appl. No. 15/394,391, Dennis D. Castleman, Remote Controlled Object Macro and Autopilot System, filed Dec. 29, 2016.

U.S. Appl. No. 15/394,329, Javier F. Rico, Mechanical Effects by Way of Software or Real World Engagement, filed Dec. 29, 2016.

U.S. Appl. No. 15/394,267, Megumi Kikuchi, Collision Detection and Avoidance, filed Dec. 29, 2016.

U.S. Appl. No. 15/394,285, Michael Taylor, Steering Assist, filed Dec. 29, 2016.

U.S. Appl. No. 15/393,855, Glenn Black, Translation of Physical Object Viewed by Unmanned Aerial Vehicle Into Virtual World Object, filed Dec. 29, 2016.

U.S. Appl. No. 15/393,875, Michael Taylor, UAV Positional Anchors, filed Dec. 29, 2016.

Williams, Elliot; "Real-life Space Invaders with Drones and Lasers," Hackaday, Sep. 19, 2016.

PCT Application No. PCT/US2017/048064 International Search Report and Written Opinion dated Nov. 7, 2017.

U.S. Appl. No. 15/711,695, Dominic S. Mallinson, Unmanned Aerial Vehicle Movement via Environmental Airflow, filed Sep. 21, 2017.

U.S. Appl. No. 15/711,961, Dominic S. Mallinson, Unmanned Aerial Vehicle Movement via Environmental Interactions, filed Sep. 21, 2017.

U.S. Appl. No. 15/394,391 Office Action dated Feb. 23, 2018.

U.S. Appl. No. 15/393,855 Office Action dated May 16, 2018.

Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.

* cited by examiner

PROXIMITY BASED NOISE AND CHAT

CROSS REFERENCE TO RELATED APPLICATIONS

The present application claims the priority benefit of U.S. patent application Ser. No. 62/402,721 filed Sep. 30, 2016, the disclosure of which is incorporated herein by reference.

BACKGROUND

Field of the Invention

The present technology pertains to combining real and simulated audio streams, and more specifically pertains to modifying and combining audio streams based on simulated and actual locations of simulated and real objects.

Description of the Related Art

Augmented reality has recently become popular with the proliferation of powerful cellular phones. Games and software are overlaying video feeds with simulated creatures, information, or other objects. However, these simply overlays lack the immersion that some users expect. For example, they generally only use video which can be impressive but not completely immersive. Furthermore, real and simulated objects rarely interact.

SUMMARY OF THE CLAIMED INVENTION

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for altering and combining real and simulated audio streams. For example, a system can determine a location of a first unmanned aerial vehicle (UAV). The system can then determine a location of an object and can receive an audio stream associated with the object. The system can then determine a distance between the location of the first UAV and the location of the object. The system can adjust the audio stream volume according to the distance. The system can then send the audio stream to a listener.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for modifying and combining audio streams based on simulated and actual locations of simulated and real objects.

Figure 1:
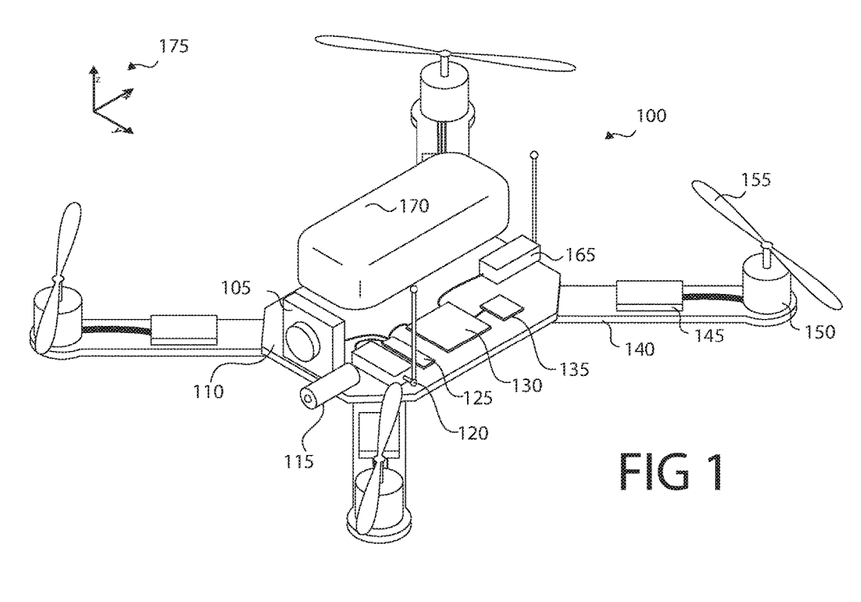
FIG. 1 shows an unmanned aerial vehicle (UAV) according to some embodiments.

FIG. 1 shows unmanned aerial vehicle (UAV) 100 according to some embodiments. UAV 100 can have one or more motors 150 configured to rotate attached propellers 155 in order to control the position of UAV 100 in the air. UAV 100 can be configured as a fixed wing vehicle (e.g., airplane), a rotary vehicle (e.g., a helicopter or multirotor), or a blend of the two. For the purpose of FIG. 1, axes 175 can assist in the description of certain features. If UAV 100 is oriented parallel to the ground, the Z axis can be the axis perpendicular to the ground, the X axis can generally be the axis that passes through the bow and stern of UAV 100, and the Y axis can be the axis that pass through the port and starboard sides of UAV 100. Axes 175 are merely provided for convenience of the description herein.

In some embodiments, UAV 100 has main body 110 with one or more arms 140. The proximal end of arm 140 can attach to main body 110 while the distal end of arm 140 can secure motor 150. Arms 140 can be secured to main body 110 in an "X" configuration, an "H" configuration, a "T" configuration, or any other configuration as appropriate. The number of motors 150 can vary, for example there can be three motors 150 (e.g., a "tricopter"), four motors 150 (e.g., a "quadcopter"), eight motors (e.g., an "octocopter"), etc.

In some embodiments, each motor 155 rotates (i.e., the drive shaft of motor 155 spins) about parallel axes. For example, the thrust provided by all propellers 155 can be in the Z direction. Alternatively, a motor 155 can rotate about an axis that is perpendicular (or any angle that is not parallel) to the axis of rotation of another motor 155. For example, two motors 155 can be oriented to provide thrust in the Z direction (e.g., to be used in takeoff and landing) while two motors 155 can be oriented to provide thrust in the X direction (e.g., for normal flight). In some embodiments, UAV 100 can dynamically adjust the orientation of one or more of its motors 150 for vectored thrust.

In some embodiments, the rotation of motors 150 can be configured to create or minimize gyroscopic forces. For example, if there are an even number of motors 150, then half of the motors can be configured to rotate counter-clockwise while the other half can be configured to rotate clockwise. Alternating the placement of clockwise and counter-clockwise motors can increase stability and enable UAV 100 to rotate about the z-axis by providing more power to one set of motors 150 (e.g., those that rotate clockwise) while providing less power to the remaining motors (e.g., those that rotate counter-clockwise).

Motors 150 can be any combination of electric motors, internal combustion engines, turbines, rockets, etc. In some embodiments, a single motor 150 can drive multiple thrust components (e.g., propellers 155) on different parts of UAV 100 using chains, cables, gear assemblies, hydraulics, tubing (e.g., to guide an exhaust stream used for thrust), etc. to transfer the power.

In some embodiments, motor 150 is a brushless motor and can be connected to electronic speed controller X45. Electronic speed controller 145 can determine the orientation of magnets attached to a drive shaft within motor 150 and, based on the orientation, power electromagnets within motor 150. For example, electronic speed controller 145 can have three wires connected to motor 150, and electronic speed controller 145 can provide three phases of power to the electromagnets to spin the drive shaft in motor 150. Electronic speed controller 145 can determine the orientation of the drive shaft based on back-emf on the wires or by directly sensing to position of the drive shaft.

Transceiver 165 can receive control signals from a control unit (e.g., a handheld control transmitter, a server, etc.). Transceiver 165 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 165 can also transmit data to a control unit. Transceiver 165 can communicate with the control unit using lasers, light, ultrasonic, infra-red, Bluetooth, 602.11x, or similar communication methods, including a combination of methods. Transceiver can communicate with multiple control units at a time.

Position sensor 135 can include an inertial measurement unit for determining the acceleration and/or the angular rate of UAV 100, a GPS receiver for determining the geolocation and altitude of UAV 100, a magnetometer for determining the surrounding magnetic fields of UAV 100 (for informing the heading and orientation of UAV 100), a barometer for determining the altitude of UAV 100, etc. Position sensor 135 can include a land-speed sensor, an air-speed sensor, a celestial navigation sensor, etc.

UAV 100 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 135 and environmental awareness sensors can all be one unit or a collection of units. In some embodiments, some features of position sensor 135 and/or the environmental awareness sensors are embedded within flight controller 130.

In some embodiments, an environmental awareness system can take inputs from position sensors 135, environmental awareness sensors, databases (e.g., a predefined mapping of a region) to determine the location of UAV 100, obstacles, and pathways. In some embodiments, this environmental awareness system is located entirely on UAV 100, alternatively, some data processing can be performed external to UAV 100.

Camera 105 can include an image sensor (e.g., a CCD sensor, a CMOS sensor, etc.), a lens system, a processor, etc. The lens system can include multiple movable lenses that can be adjusted to manipulate the focal length and/or field of view (i.e., zoom) of the lens system. In some embodiments, camera 105 is part of a camera system which includes multiple cameras 105. For example, two cameras 105 can be used for stereoscopic imaging (e.g., for first person video, augmented reality, etc.). Another example includes one camera 105 that is optimized for detecting hue and saturation information and a second camera 105 that is optimized for detecting intensity information. In some embodiments, camera 105 optimized for low latency is used for control systems while a camera 105 optimized for quality is used for recording a video (e.g., a cinematic video). Camera 105 can be a visual light camera, an infrared camera, a depth camera, etc.

A gimbal and dampeners can help stabilize camera 105 and remove erratic rotations and translations of UAV 100. For example, a three-axis gimbal can have three stepper motors that are positioned based on a gyroscope reading in order to prevent erratic spinning and/or keep camera 105 level with the ground.

Video processor 125 can process a video signal from camera 105. For example video process 125 can enhance the image of the video signal, down-sample or up-sample the resolution of the video signal, add audio (captured by a microphone) to the video signal, overlay information (e.g., flight data from flight controller 130 and/or position sensor), convert the signal between forms or formats, etc.

Video transmitter 120 can receive a video signal from video processor 125 and transmit it using an attached antenna. The antenna can be a cloverleaf antenna or a linear antenna. In some embodiments, video transmitter 120 uses a different frequency or band than transceiver 165. In some embodiments, video transmitter 120 and transceiver 165 are part of a single transceiver.

Battery 170 can supply power to the components of UAV 100. A battery elimination circuit can convert the voltage from battery 170 to a desired voltage (e.g., convert 12v from battery 170 to 5v for flight controller 130). A battery elimination circuit can also filter the power in order to minimize noise in the power lines (e.g., to prevent interference in transceiver 165 and transceiver 120). Electronic speed controller 145 can contain a battery elimination circuit. For example, battery 170 can supply 12 volts to electronic speed controller 145 which can then provide 5 volts to flight controller 130. In some embodiments, a power distribution board can allow each electronic speed controller (and other devices) to connect directly to the battery.

In some embodiments, battery 170 is a multi-cell (e.g., 2S, 3S, 4S, etc.) lithium polymer battery. Battery 170 can also be a lithium-ion, lead-acid, nickel-cadmium, or alkaline battery. Other battery types and variants can be used as known in the art. Additional or alternative to battery 170, other energy sources can be used. For example, UAV 100 can use solar panels, wireless power transfer, a tethered power cable (e.g., from a ground station or another UAV 100), etc. In some embodiments, the other energy source can be utilized to charge battery 170 while in flight or on the ground.

Battery 170 can be securely mounted to main body 110. Alternatively, battery 170 can have a release mechanism. In some embodiments, battery 170 can be automatically replaced. For example, UAV 100 can land on a docking station and the docking station can automatically remove a discharged battery 170 and insert a charged battery 170. In some embodiments, UAV 100 can pass through docking station and replace battery 170 without stopping.

Battery 170 can include a temperature sensor for overload prevention. For example, when charging, the rate of charge can be thermally limited (the rate will decrease if the temperature exceeds a certain threshold). Similarly, the power delivery at electronic speed controllers 145 can be thermally limited—providing less power when the temperature exceeds a certain threshold. Battery 170 can include a charging and voltage protection circuit to safely charge battery 170 and prevent its voltage from going above or below a certain range.

UAV 100 can include a location transponder. For example, in a racing environment, race officials can track UAV 100 using location transponder. The actual location (e.g., X, Y, and Z) can be tracked using triangulation of the transponder. In some embodiments, gates or sensors in a track can determine if the location transponder has passed by or through the sensor or gate.

Flight controller 130 can communicate with electronic speed controller 145, battery 170, transceiver 165, video processor 125, position sensor 135, and/or any other component of UAV 100. In some embodiments, flight controller 130 can receive various inputs (including historical data) and calculate current flight characteristics. Flight characteristics can include an actual or predicted position, orientation, velocity, angular momentum, acceleration, battery capacity, temperature, etc. of UAV 100. Flight controller 130 can then take the control signals from transceiver 165 and calculate target flight characteristics. For example, target flight characteristics might include "rotate x degrees" or "go to this GPS location". Flight controller 130 can calculate response characteristics of UAV 100. Response characteristics can include how electronic speed controller 145, motor 150, propeller 155, etc. respond, or are expected to respond, to control signals from flight controller 130. Response characteristics can include an expectation for how UAV 100 as a system will respond to control signals from flight controller 130. For example, response characteristics can include a determination that one motor 150 is slightly weaker than other motors.

After calculating current flight characteristics, target flight characteristics, and response characteristics flight controller 130 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 130 are performed by a system external to UAV 100. For example, current flight characteristics can be sent to a server that returns the optimized control signals. Flight controller 130 can send the optimized control signals to electronic speed controllers 145 to control UAV 100.

In some embodiments, UAV 100 has various outputs that are not part of the flight control system. For example, UAV 100 can have a loudspeaker for communicating with people or other UAVs 100. Similarly, UAV 100 can have a flashlight or laser. The laser can be used to "tag" another UAV 100.

Figure 2:
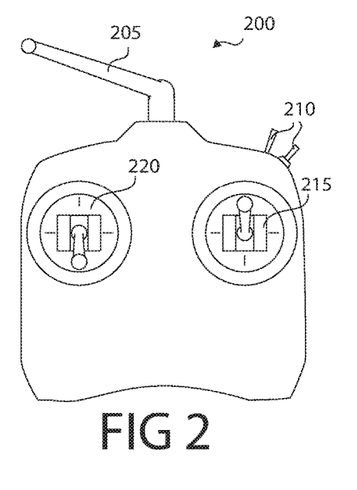
FIG. 2 shows a control transmitter according to some embodiments.

UAV 100 can have blaster 115 for interacting with other UAVs, the environment, or simulated objects. Blaster 115 can be a laser, flashlight (e.g., for infrared or visible light), projectile launcher (e.g., to send darts, balls, or other objects in the air), etc. In some embodiments, blaster 115 is passive and merely serves as an indicator for the positioning of a corresponding simulated blaster that FIG. 2 shows control transmitter 200 according to some embodiments. Control transmitter 200 can send control signals to transceiver 165. Control transmitter can have auxiliary switches 210, joysticks 215 and 220, and antenna 205. Joystick 215 can be configured to send elevator and aileron control signals while joystick 220 can be configured to send throttle and rudder control signals (this is termed a mode 2 configuration). Alternatively, joystick 215 can be configured to send throttle and aileron control signals while joystick 220 can be configured to send elevator and rudder control signals (this is termed a mode 1 configuration). Auxiliary switches 210 can be configured to set options on control transmitter 200 or UAV 100. In some embodiments, control transmitter 200 receives information from a transceiver on UAV 100. For example, it can receive some current flight characteristics from UAV 100.

Figure 3:
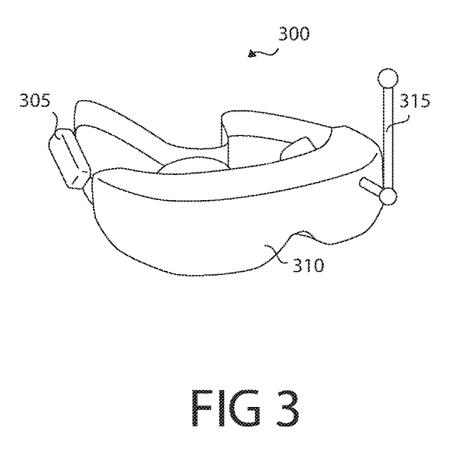
FIG. 3 shows a display according to some embodiments.

FIG. 3 shows display 300 according to some embodiments. Display 300 can include battery 305 or another power source, display screen 310, and receiver 315. Display 300 can receive a video stream from transmitter 120 from UAV 100. Display 300 can be a head-mounted unit as depicted in FIG. 3. Display 300 can be a monitor such that multiple viewers can view a single screen. In some embodiments, display screen 310 includes two screens, one for each eye; these screens can have separate signals for stereoscopic viewing. In some embodiments, receiver 315 is mounted on display 3100 (as shown in FIG. 3), alternatively, receiver 315 can be a separate unit that is connected using a wire to display 300. In some embodiments, display 300 is mounted on control transmitter 200.

Figure 4:
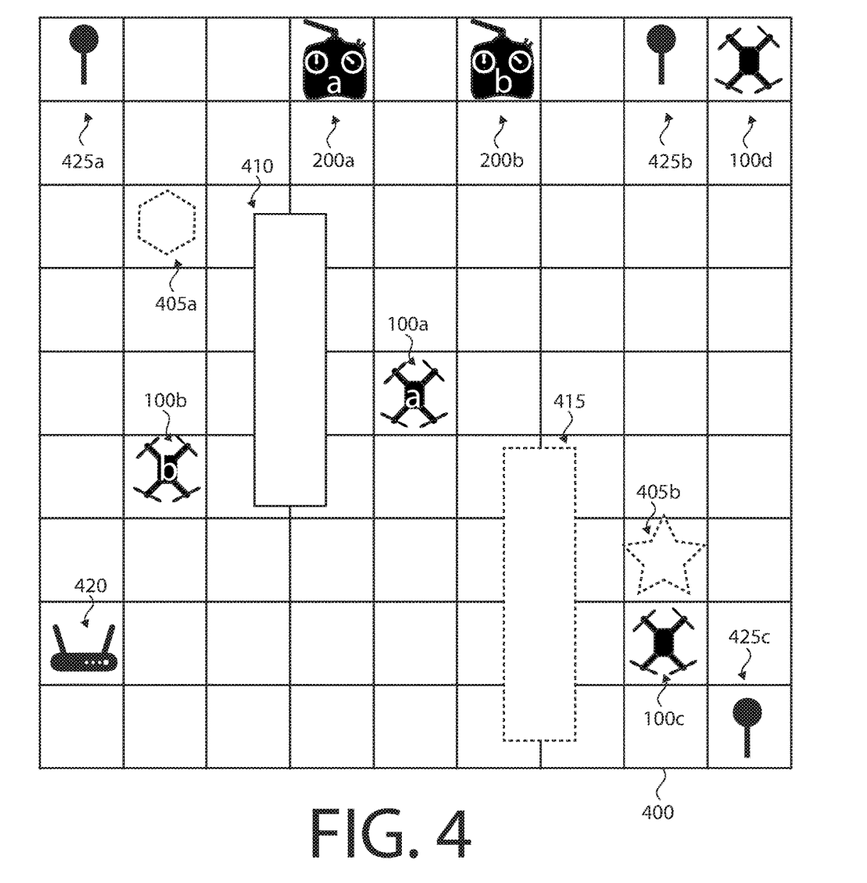
FIG. 4 shows various real and simulated objects in an environment.

FIG. 4 shows various real and simulated objects in environment 400. Environment 400 can be a map of a physical location (e.g., a park, a field, a building, a region, etc.) or a simulated location. Environment 400 is shown in FIG. 4 with a grid to indicate the positions of objects within environment 400. Environment 400 can contain real objects such as: UAVs 100a, 100b, 100c, and 100d; control transmitters 200a and 200b; obstruction 410; sensors 425a, 425b, and 425c; base station 420; etc. Environment 400 can contain simulated objects such as sound emitters 405a and 405b as well as obstruction 415. In some embodiments, the locations of the real objects can be mapped into a simulated space with the simulated objects (e.g., projecting the real objects into a simulated space). Alternatively, the locations of the simulated objects can be mapped into a real-space with the real objects (e.g., projecting the simulated objects into a real space). In some embodiments, absolute positions are unknown and only relative positions between real and simulated objects can be calculated.

In some embodiments, a real object can represent a simulated object. For example, a real balloon can represent the position of a simulated dragon. Objects that have a physical presence can be termed "real" while objects that lack a physical presence can be termed "simulated."

Control transmitter 200a can be connected to UAV 100a while transmitter 200b can be connected to UAV 100b. An operator can operate each control transmitter 200 to control UAV 100.

Base station 420 can be in communication with real objects in environment 400, for example base station 420 can wirelessly communicate (using, e.g., Bluetooth, infrared, wifi, light, etc.) with UAV 100a and gather telemetry, send instructions, etc. Base station can, using sensors 425a, 425b, and 425c, detect the positions of real objects in environment 400. Position can include location, orientation, and configuration (e.g., the shape and makeup of the object). Sensors 425a, 425b, and 425c can use visible light cameras, infrared cameras, LIDAR, RADAR, or other similar systems to detect the position of objects. In some embodiments, sensors 425*a*, 425*b*, and 425*c* detect a marker (visible or RF) on objects to determine their position. A marker on objects can be passive or actively powered.

In some embodiments, base station 420 receives signals from control transmitters 200 and, after processing them if necessary, sends control signals to UAVs 100. In some embodiments, some UAVs are controlled by an operator (e.g., UAV 100*a* and 100*b*) while others can be autonomously controlled (e.g., UAV 100*c* and UAV 100*d*) by base station 420.

Base station 420 can act as an arena server and can be a central location for data processing, control signals, video signals, audio signals, etc. Base station 420 can keep track of real and simulated objects. Base station 420 can simulate the actions of simulated objects. For example, a simulated object can be a simulated enemy fighter plane and base station 420 can have artificial intelligence that dictates the actions of the simulated enemy fighter plane.

Base station 420 can simulate environment 400. For example, environment can be representative of a real location such as a park with hills, benches, and trees. Base station 420 can determine the topology of the park and create simulated representations of the hills, benches, and trees (e.g., using sensors 425*a*, 425*b*, and 425*c*, using information from a database, etc.). Base station 420 can simulate an environment that takes few or no cues from the actual location of environment 400. For example, base station 420 can simulate an outer space environment even though environment 400 is representative of a park.

Base station 420 can simulate atmospheric and sensory aspects of environment 400. For example, base station 420 can render three-dimensional views of environment 420 from various locations (e.g., at the location of UAV 100*a* to provide a simulated first-person view from UAV 100*a*).

Base station 420 can facilitate the playing of games within environment 400. For example, base station 420 can simulate and facilitate games like capture the flag, racing, tag, dogfighting, etc.

In some embodiments, base station 420 can receive multiple audio streams (e.g., recorded at microphones associated with real objects such as control transmitter 200*a*, control transmitter 200*b*, UAV 100*a*, UAV 100*b*, etc. Base station 420 can generate audio streams for real and/or simulated objects. For example, if simulated object 405 *b* is a volcano, base station 420 can generate an audio stream of the volcano erupting and associate the audio stream with the location of simulated object 405*b*. Base station 420 can then filter, alter, and recombine the audio streams for presentation. For example, an operator that is controlling UAV 100*a* with control transmitter 200*a* can wear headphones (or have a speaker) connected to base station 420. Base station 420 can generate an output audio stream using real and simulated audio streams. This output audio stream can be associated with the location of UAV 100*a* but can be sent to the operator's headphones.

Base station 420 can determine the distance between UAV 100*a* and nearby sound emitters (e.g., sound sources such as real or simulated objects). It can then combine the audio streams to generate the output audio stream. Nearby objects (whether real or simulated) can have their associated audio streams amplified while far objects can have their associated audio streams weakened (or diminished in volume). For example, an audio stream from UAV 100*b* can be loud while an audio stream from UAV 100*d* can be softer. In some embodiments, a delay can be applied proportional to the distance to simulate the travel time of the audio stream.

In some embodiments, an audio stream can be occluded (or blocked). For example, UAV 100*b* can be on one side of obstruction 410 while UAV 100*a* can be on the other side of obstruction 410. Because obstruction 410 is a real object, it might occlude sound from UAV 100*b* such that the sound is altered (e.g., softened or distorted) by the time it reaches UAV 100*a*. Base station 420 can similarly alter an audio stream associated with UAV 100*b* as it is sent to a listener associated with UAV 100*a*. For example, an operator at control transmitter 200*b* can speak into a microphone which can then send an audio stream to base station 420. Base station 420 can determine that the audio steam is associated with UAV 100*b* and that a listener (e.g., an operator at control transmitter 200*a*) is associated with UAV 100*a*. Base station 420 can then alter the audio stream and send it to the listener (unless the occlusion completely blocks the audio stream).

Objects (real and simulated) can have occlusion properties. For example, an object might block or degrade certain frequencies. In some embodiments, a real object has certain real occlusions properties while base station 420 can apply simulated occlusion properties to the object. For example, a real wall might block most sound that passes through it but base station 420 can simulate the wall having other properties (e.g., it might not block sound at all).

In some embodiments, an audio stream can be reflected. For example, when creating an output audio stream for UAV 100*b*, base station 420 can combine a direct audio stream from simulated object 405*a* with a reflected audio stream from simulated object 405*a* as if it were reflected off obstruction 410. The reflected audio stream can be delayed (relative to the direct audio stream) based on the greater distance of travel. The reflected audio stream can have a decreased volume based on the travel. The reflected audio stream can have certain frequencies partially absorbed based on the characteristics of obstruction 410. For example, a cloth obstruction can absorb high frequency sounds while an obstruction with gaps can reflect primarily high frequency sounds. A high pass or low pass filter can simulate these absorptive properties. In some embodiments, multiple reflected audio streams can be generated; e.g., a reflected audio stream off obstruction 410, and another off the ground.

In some embodiments, base station 420 can simulate a wind. For example, if a simulated wind is moving from top right to bottom left in FIG. 4, base station 420 can make an audio stream associated with UAV 100*d* be louder to an output audio stream for UAV 100*a* while an audio stream associated with UAV 100*b* can be softer. The simulated wind can be based on actual wind existing in environment 400. For example, a wind-speed device can detect the speed of the actual wind.

In some embodiments, base station 420 can simulate Doppler shifts. For example, an audio stream associated with a (real or simulated) object moving towards or away from a reference object can be shifted to be higher or lower pitched based on the motion.

In some embodiments, real obstructions are dynamically discovered. For example, UAV 100*a* can send a test signal (e.g., an ultrasonic or infrared pulse) which UAV 100*b* can detect. The test signal can have multiple component signals (e.g., multiple frequencies). Based on the intensity and quality of the received test signal, base station 420 can determine appropriate alterations that can be made to emulate the occlusion. For example, if the test signal is emitted at one frequency, but detected at a different frequency, the frequency shift can be replicated with the audio stream associated with UAV 100*a*. Other alterations to a sound can be detected. For example, reflections (e.g., an echo), interference, equalization (e.g., enhanced or diminished intensity of various component frequencies), Doppler shifts, etc.

In some embodiments, various objects can be part of groupings. The respective audio streams of objects can be active, muted, or altered based on their groupings. For example, if objects are organized into teams, output audio streams can include only audio streams associated with the object's team. For example, UAV 100*a* and an operator of control transmitter 200*a* can be on a team with UAV 100*b* and its associated operator of control transmitter 200*b*. An audio stream associated with UAV 100*b* and an audio stream associated with control transmitter 200*b* can be combined into an output audio stream for the operator of control transmitter 200*a*. If UAV 100*c* and UAV 100*d* are on a different team, their associated audio streams can be isolated from the output audio stream for the operator of control transmitter 200*a*. In some embodiments, objects can be parented such that a "parent" can receive audio streams from its children, but its children can only receive audio streams from the parent (and not siblings). This can be useful if one operator is assigned as a captain for a team of other operators.

Figure 5:
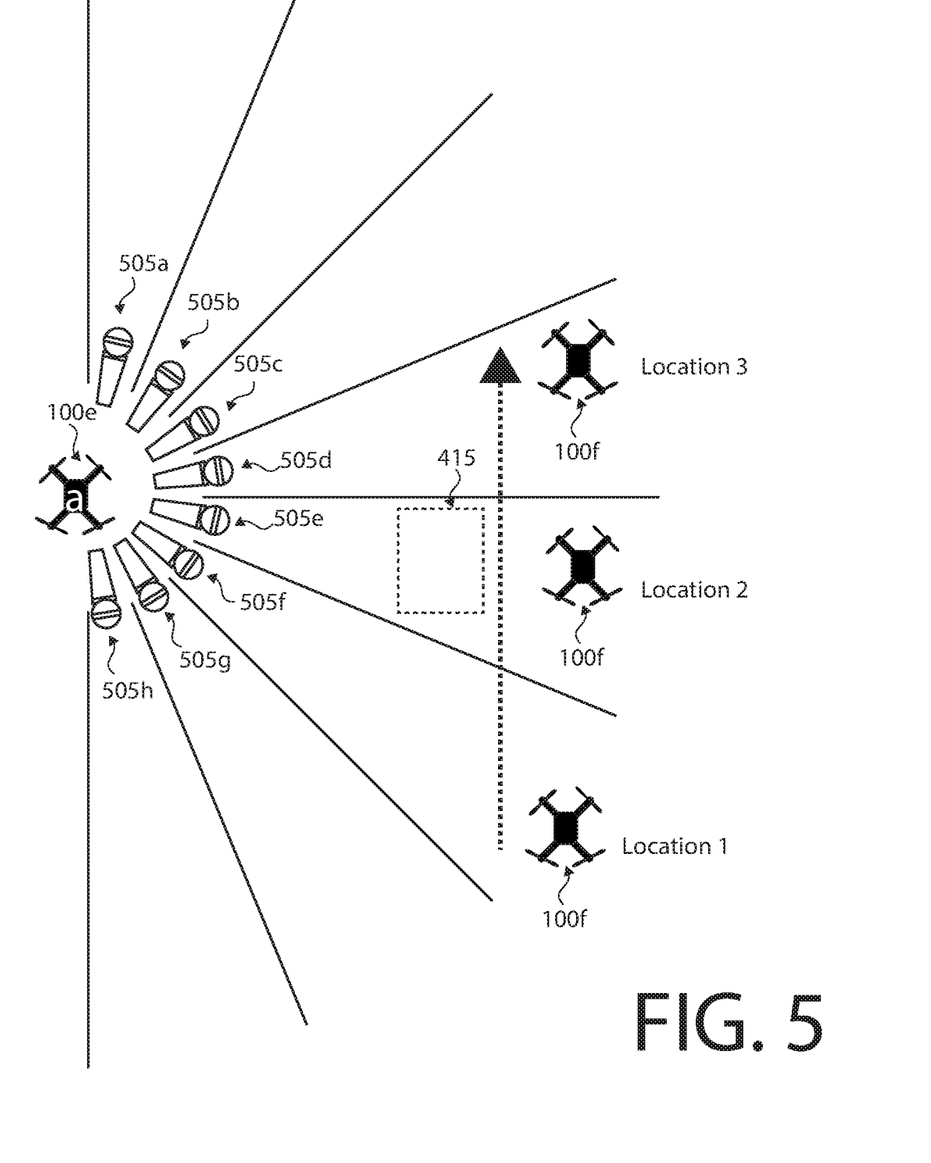
FIG. 5 shows a UAV with an array of directional microphones according to some embodiments.

FIG. 5 shows UAV 100*e* with an array of directional microphones according to some embodiments. UAV 100*e* can have an array of directional microphones (e.g., microphones 505*a*-505*h*), each with a respective recording region. There can be any number of directional microphones (e.g., one, two, four, eight, etc.). The directional microphones can be arranged in a circle (e.g., they can all be coplanar); alternatively, some microphones can be directed above and below the other microphones for spherical coverage. Base station 420 can use position data for objects (e.g., UAV 100*f*) to determine which audio streams should be active. For example, when UAV 100*f* is in location 1, the audio stream from microphone 505*f* can be active (e.g., provided to an output audio stream associated with UAV 100*e*). As UAV 100*f* moves away from location 1, the audio stream from microphone 505*f* can be gradually muted. As UAV 100*f* moves into location 2, the audio stream from microphone 505*e* can be gradually activated (e.g., provided to an output audio stream associated with UAV 100*e*).

As an object (e.g., UAV 100*f*) moves "behind" a simulated obstruction 415, the respective audio stream can be modified accordingly. For example, even though microphone 505*e* can detect sound from UAV 100*f*, base station 420 can determine that simulated obstruction 415 is in between UAV 100*e* and UAV 100*f* at location 2. Base station can then decrease the volume of the audio stream from microphone 505*e* or otherwise modify the audio stream based on audio occlusion properties of simulated obstruction 415.

In some embodiments multiple microphones 505 can be placed a distance apart and can isolate audio streams based on the time it takes the stream to get to the respective microphones.

It should be understood that multiple audio streams from various sources (real or simulated) can be mapped to environment 400, modified according occluding and/or reflecting objects (real or simulated), combined according to a reference location, and sent to a listener (who may be at a different location than reference location).

Figure 6A:
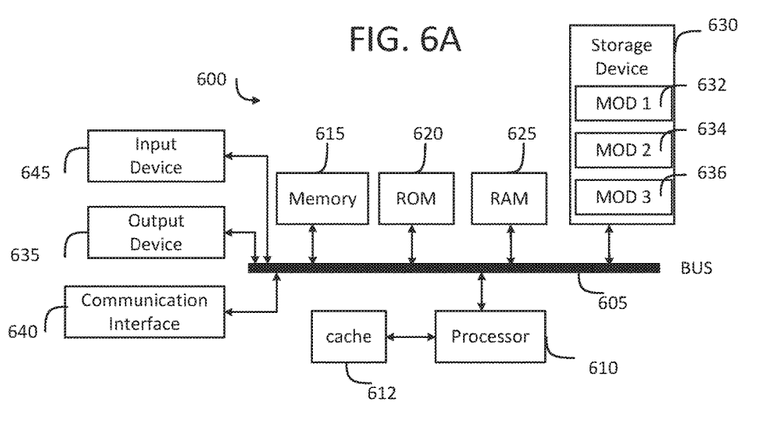
FIG. 6A and FIG. 6B illustrate example system embodiments.
Figure 6B:
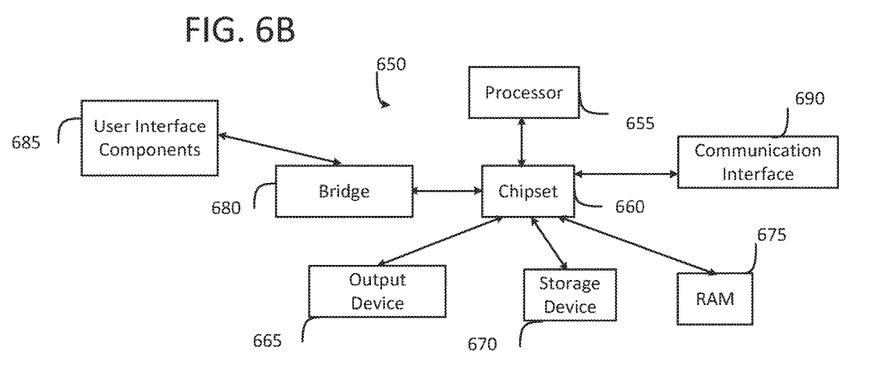

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 7 634, and module 3 636 stored in storage device 630, configured to control the processor 910 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 670, and hybrids thereof.

The storage device 630 can include software modules 637, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A computer-implemented method for modifying audio streams, the method comprising:
    detecting a physical location of a first unmanned aerial vehicle (UAV) within an environment, wherein the physical location of the first UAV is detected by one or more sensors monitoring the environment;
    tracking a location of a simulated object within the environment, the simulated object associated with a sound emitter, wherein the tracked location is obtained from a database stored in memory;
    receiving an audio stream associated with the sound emitter;
    identifying a distance between the physical location of the first UAV and the tracked location of the simulated object within the environment; and
    processing the audio stream before transmitting to an operator output device associated with the first UAV, wherein a volume of the audio stream is amplified or diminished according to the identified distance.

2. The computer-implemented method of claim 1, wherein the simulated object has audio occlusion properties, and further comprising:
    identifying that the tracked location of the simulated object is between the physical location of the first UAV and a location of a second object within the environment; and
    processing an audio stream associated with the second object before transmitting to the operator output device according to the audio occlusion properties of the simulated object.

3. The computer-implemented method of claim 1, wherein processing the audio stream includes applying a low pass filter to the audio stream based on the audio occlusion properties of the simulated object.

4. The computer-implemented method of claim 1, wherein the simulated object is represented by a second UAV, and wherein receiving the audio stream comprises capturing audio via a microphone placed within range of an operator of the second UAV.

5. The computer-implemented method of claim 1, further comprising receiving an audio stream from a microphone attached to the first UAV, the microphone being one of a plurality of directional microphones, wherein processing the audio stream includes combining the audio stream associated with the sound emitter with the audio stream from the microphone.

6. The computer-implemented method claim 1, further comprising:
identifying a grouping of the simulated object; and
playing the audio stream on a device associated with a listener, wherein the audio stream being played is based on a the identified grouping of the simulated object.

7. A system for modifying audio streams, the system comprising:
a sound emitter associated with a simulated object within an environment;
one or more sensors monitoring the environment;
a processor; and
memory that stores non-transitory instructions executable by the processor to perform a method comprising:
detecting a physical location of a first unmanned aerial vehicle (UAV) within the environment, wherein the physical location of the first UAV is detected by the one or more sensors;
tracking a location of the simulated object within the environment, wherein the tracked location is obtained from a database stored in memory;
receiving an audio stream associated with the sound emitter;
identifying a distance between the physical location of the first UAV and the tracked location of the simulated object within the environment; and
processing the audio stream before transmitting to an operator output associated with the first UAV, wherein a volume of the audio stream is amplified or diminished according to the identified distance.

8. The system of claim 7, wherein the simulated object has audio occlusion properties, and wherein the memory stores instructions executable by the processor to perform the method further comprising:
identifying that the tracked location of the simulated object is between the physical location of the first UAV and a location of a second object within the environment; and
processing an audio stream associated with the second object before transmitting to the operator output device according to the audio occlusion properties of the simulated object.

9. The system of claim 8, wherein the processor processes the audio stream by applying a low pass filter to the audio stream based on the audio occlusion properties of the simulated object.

10. The system of claim 7, wherein the simulated object is represented by a second UAV, and wherein receiving the audio stream comprises capturing audio via a microphone placed within range of an operator of the second UAV.

11. The system of claim 7, wherein the further comprising receiving an audio stream from a microphone attached to the first UAV, the microphone being one of a plurality of directional microphones, wherein processing the audio stream includes combining the audio stream associated with the sound emitter with the audio stream from the microphone.

12. The system of claim 7, wherein the memory stores instructions executable by the processor to perform the method further comprising:
identifying a grouping of the simulated object; and
playing the audio stream on a device associated with a listener, wherein the audio stream being played is based on the grouping of the simulated object.

13. A non-transitory computer-readable medium having computer readable instructions stored thereon that, when executed by a processor of a computer, cause the computer to perform a method for modifying audio streams, the method comprising:
detecting a physical location of a first unmanned aerial vehicle (UAV) within an environment, wherein the physical location of the first UAV is detected by one or more sensors monitoring the environment;
tracking a location of a simulated object within the environment, the simulated object associated with a sound emitter, wherein the tracked location is obtained from a database stored in memory;
receiving an audio stream associated with the sound emitter;
identifying a distance between the physical location of the first UAV and the tracked location of the simulated object within the environment; and
processing the audio stream before transmitting to an operator output device associated with the first UAV, wherein a volume of the audio stream is amplified or diminished according to the identified distance.

14. The non-transitory computer-readable medium of claim 13, wherein the simulated object has audio occlusion properties, and further comprising:
identifying that the tracked location of the simulated object is between the physical location of the first UAV and a location of a second object within the environment; and
processing an audio stream associated with the second object before transmitting to the operator output device according to the audio occlusion properties of the simulated object.

15. The non-transitory computer-readable medium of claim 14, wherein processing the audio stream includes applying a low pass filter to the audio stream based on the audio occlusion properties of the simulated object.

16. The non-transitory computer-readable medium of claim 13, wherein the simulated object is represented by a second UAV, and wherein receiving the audio stream comprises capturing audio via a microphone placed within range of an operator of the second UAV.

17. The non-transitory computer-readable medium of claim 13, further comprising instructions executable to:
identify a grouping of the simulated object; and
play the audio stream on a device associated with a listener, wherein the audio stream being played is based on of the identified grouping of the simulated object.

* * * * *